United States Patent
Huerta-Ochoa

(10) Patent No.: US 10,624,354 B2
(45) Date of Patent: Apr. 21, 2020

(54) MIXING MACHINE WITH VFD BASED DIAGNOSTICS

(71) Applicant: ILLINOIS TOOL WORKS INC., Glenview, IL (US)

(72) Inventor: Ruben T. Huerta-Ochoa, Troy, OH (US)

(73) Assignee: ILLINOIS TOOL WORKS INC., Glenview, IL (US)

(*) Notice: Subject to any disclaimer, the term of this patent is extended or adjusted under 35 U.S.C. 154(b) by 116 days.

(21) Appl. No.: 15/906,349

(22) Filed: Feb. 27, 2018

(65) Prior Publication Data

US 2018/0242594 A1 Aug. 30, 2018

Related U.S. Application Data

(60) Provisional application No. 62/464,439, filed on Feb. 28, 2017.

(51) Int. Cl.
*A21C 1/00* (2006.01)
*A21C 1/14* (2006.01)
(Continued)

(52) U.S. Cl.
CPC .............. *A21C 1/145* (2013.01); *A21C 1/02* (2013.01); *A21C 1/1465* (2013.01);
(Continued)

(58) Field of Classification Search
CPC ......... A21C 1/145; A21C 1/02; A21C 1/1465; H02P 29/0241; H02P 29/024; G08B 21/185

See application file for complete search history.

(56) References Cited

U.S. PATENT DOCUMENTS 1,767,002 A 6/1930 Meeker et al.
1,781,321 A 11/1930 DeHuff
(Continued)

FOREIGN PATENT DOCUMENTS

| EP | 2448220 | 5/2012 |
| WO | WO 2005/112722 | 12/2005 |
| WO | WO 2016/145430 | 9/2016 |

OTHER PUBLICATIONS

PCT, International Search Report and Written Opinion, International Application No. PCT/US2018/019833; dated May 7, 2018, 13 pages.

*Primary Examiner* — Anshu Bhatia
(74) *Attorney, Agent, or Firm* — Thompson Hine LLP

(57) ABSTRACT

A mixing machine includes a head extending over a bowl receiving location, a rotatable output shaft for receiving a mixer tool, and a gear system for effecting rotation of the rotatable output shaft about its axis and orbiting of the shaft axis about another axis. An electric motor includes an output operatively connected to drive the gear system. A variable frequency drive is connected to deliver 3-phase power to the electric motor to achieve variable speed and torque. The variable frequency drive includes a plurality of embedded sensors, including embedded current sensors and embedded voltage sensors. A diagnostic control is configured and operable to analyze outputs from the embedded sensors and produce an alert indication upon identification of a characteristic indicative of at least one of input power brownout, input power surge, machine short circuit, motor phase insulation arch, motor phase to ground arch or motor loss of phase.

9 Claims, 3 Drawing Sheets

(51) Int. Cl.
  *H02P 29/024* (2016.01)
  *G08B 21/18* (2006.01)
  *A21C 1/02* (2006.01)

(52) U.S. Cl.
  CPC .......... *G08B 21/185* (2013.01); *H02P 29/024* (2013.01); *H02P 29/0241* (2016.02)

(56) References Cited

U.S. PATENT DOCUMENTS

| | | |
|---|---|---|
| 2,019,911 A | 11/1935 | Meeker |
| 2,181,079 A | 11/1939 | DeHuff |
| 2,185,155 A | 12/1939 | Meeker et al. |
| 2,251,903 A | 8/1941 | Anstice et al. |
| 2,616,673 A | 11/1952 | Van Guilder |
| 3,422,330 A | 1/1969 | Swanke |
| 3,951,351 A | 4/1976 | Ernster et al. |
| 4,568,193 A | 2/1986 | Contri et al. |
| 4,697,929 A | 10/1987 | Muller |
| 4,819,460 A | 4/1989 | Obradovic |
| 4,822,172 A | 4/1989 | Stottmann |
| 4,860,816 A | 8/1989 | Bond |
| 4,893,942 A | 1/1990 | Stottmann |
| 5,000,578 A | 3/1991 | Artin et al. |
| 5,087,864 A | 2/1992 | Abel |
| 5,140,248 A | 8/1992 | Rowan et al. |
| 5,204,606 A | 4/1993 | Kuwahara et al. |
| 5,306,083 A | 4/1994 | Caldwell et al. |
| 5,348,393 A | 9/1994 | Pappas, Jr. |
| 5,472,276 A | 12/1995 | Ratermann et al. |
| 5,547,278 A | 8/1996 | Xie |
| 5,570,955 A | 11/1996 | Swartwout et al. |
| 5,653,535 A | 8/1997 | Xie et al. |
| 5,690,427 A | 11/1997 | Jennings |
| 5,736,828 A | 4/1998 | Turner et al. |
| 5,844,343 A | 12/1998 | Horst |
| 5,872,435 A | 2/1999 | Bolte et al. |
| 5,906,432 A | 5/1999 | Wade et al. |
| 5,934,802 A | 8/1999 | Xie |
| 5,955,861 A | 9/1999 | Jeong et al. |
| 5,957,021 A | 9/1999 | Meredith et al. |
| 6,066,074 A | 5/2000 | Marcinkiewicz |
| 6,313,597 B1 | 11/2001 | Elliott et al. |
| 6,429,612 B1 | 8/2002 | Kume et al. |
| 6,638,122 B1 | 10/2003 | Griffith, Sr. |
| 6,704,212 B2 | 3/2004 | Furukawa et al. |
| D490,271 S | 5/2004 | Short et al. |
| 6,750,629 B2 | 6/2004 | Shigemizu et al. |
| 6,756,757 B2 | 6/2004 | Marcinkiewicz |
| 6,883,959 B2 | 4/2005 | Donthnier et al. |
| 6,953,278 B2 | 10/2005 | Short et al. |
| 6,972,541 B2 | 12/2005 | Matsushiro et al. |
| 6,998,557 B2 | 2/2006 | McGuffin-Noll |
| 7,005,825 B2 | 2/2006 | Eguchi |
| 7,014,354 B2 | 3/2006 | Donthnier et al. |
| 7,207,711 B2 | 4/2007 | Huang |
| 7,273,315 B2 | 9/2007 | Huang |
| 7,384,187 B2 | 6/2008 | Blackburn |
| 7,387,430 B2 | 6/2008 | Short |
| 7,543,980 B2 | 6/2009 | Blackburn |
| 7,950,843 B2 | 5/2011 | Blackburn |
| 8,308,344 B2 | 11/2012 | Short |
| 2002/0093877 A1 | 7/2002 | Brunswick et al. |
| 2003/0165068 A1 | 9/2003 | Tomonaga |
| 2004/0008005 A1 | 1/2004 | Sakai et al. |
| 2004/0120213 A1 | 6/2004 | Short et al. |
| 2004/0120215 A1 | 6/2004 | Huang et al. |
| 2004/0208082 A1* | 10/2004 | Huang ............... A21C 1/02 366/206 |
| 2005/0122836 A1 | 6/2005 | Boyle et al. |
| 2005/0141340 A1 | 6/2005 | Donthnier et al. |
| 2006/0044935 A1 | 3/2006 | Benelli |
| 2006/0198240 A1 | 7/2006 | Short |
| 2006/0227654 A1 | 10/2006 | Blackburn |
| 2007/0195641 A1 | 8/2007 | Schnipke |
| 2008/0221739 A1 | 9/2008 | Pryor |
| 2008/0291777 A1 | 11/2008 | Schnipke |
| 2009/0110788 A1 | 4/2009 | Ciancimino |
| 2009/0190438 A1 | 7/2009 | Short |
| 2011/0186668 A1* | 8/2011 | Seidler ............... A47J 27/004 241/98 |
| 2011/0241590 A1 | 10/2011 | Horikoshi |
| 2012/0226764 A1 | 9/2012 | Philip |
| 2013/0214716 A1* | 8/2013 | Barfus ............... A47J 43/08 318/434 |
| 2013/0293988 A1 | 11/2013 | Li |
| 2014/0064018 A1 | 3/2014 | Lin |
| 2014/0070743 A1 | 3/2014 | Yoshida |
| 2014/0269154 A1 | 9/2014 | Kolar |
| 2014/0345474 A1 | 11/2014 | Trench Rocha |
| 2015/0331051 A1 | 11/2015 | Maki |
| 2018/0059790 A1 | 3/2018 | Kolar |
| 2018/0242595 A1 | 8/2018 | Huerta-Ochoa |

* cited by examiner

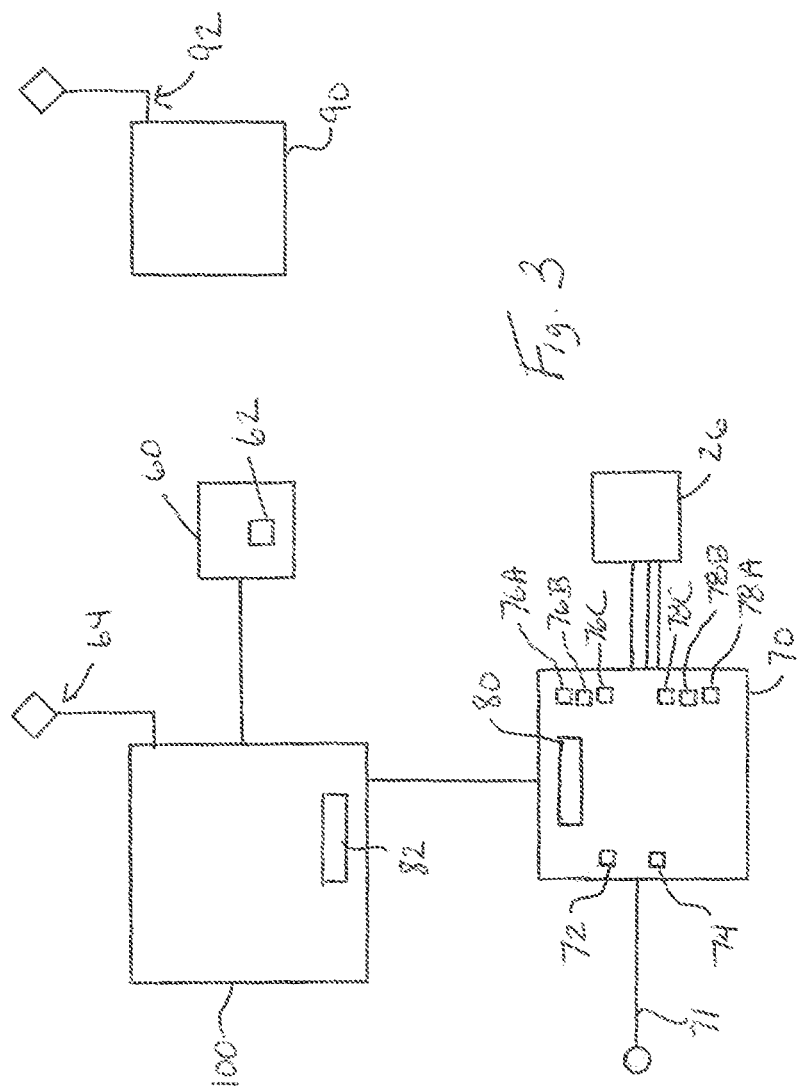

MIXING MACHINE WITH VFD BASED DIAGNOSTICS

TECHNICAL FIELD

The present application relates generally to commercial mixers utilized for mixing food products such as dough, and more particularly to a commercial mixer with a variable frequency drive (VFD) and associated diagnostic system.

BACKGROUND

It is known in existing commercial mixers to provide multiple speed settings for the mixers. The various available mixing speeds are primarily driven by a motor through combinations of gears and/or belts and/or variable adjustable pulleys, where mechanical adjustments are made to change mix speeds. Many such devices require that the mixer be stopped in order to change speeds.

U.S. Pat. No. 7,207,711 is representative of a mixer that does not utilize mechanical adjustment of any drive linkage or gear system to change speeds, but instead simply adjusted the output speed of, for example, an AC induction motor. Even with the advantages provided by such a mixing machine drive and control arrangement, due to the relatively harsh operating conditions for such machines, service/repair issues regularly arise.

It would be desirable to provide a mixing machine that readily identifies potential power system issues in the machine.

SUMMARY

In one aspect, a mixing machine includes a variable frequency drive with embedded current and voltage sensors, and a diagnostic control operable to analyze outputs from the embedded sensors and produce alerts upon identification of a characteristic indicative of input power brownout, input power surge, machine short circuit, motor phase insulation arch, motor phase to ground arch and/or motor loss of phase.

In another aspect, a mixing machine includes a head extending over a bowl receiving location, the head including a downwardly extending rotatable output shaft for receiving a mixer tool, the head including a gear system therewithin for effecting rotation of the rotatable output shaft about its axis and orbiting of the shaft axis about another axis. An electric motor includes an output operatively connected to drive the gear system. A variable frequency drive is connected to deliver 3-phase power to the electric motor to achieve variable speed and torque, wherein the variable frequency drive includes a plurality of embedded sensors, including embedded current sensors and embedded voltage sensors. A diagnostic control is configured and operable to analyze outputs from the embedded sensors and produce an alert indication upon identification of a characteristic indicative of at least one of input power brownout, input power surge, machine short circuit, motor phase insulation arch, motor phase to ground arch or motor loss of phase.

In a further aspect, a mixing machine includes a head extending over a bowl receiving location, the head including a downwardly extending rotatable output shaft for receiving a mixer tool, the head including a planetary system therewithin for effecting rotation of the rotatable output shaft about its axis and orbiting of the shaft axis about another axis. An electric motor includes an output operatively connected to drive the gear system. A variable frequency drive is connected to deliver 3-phase power to the electric motor to achieve variable speed and torque, wherein the variable frequency drive includes a plurality of embedded sensors, including embedded current sensors and embedded voltage sensors. A diagnostic control is operable to analyze outputs from the embedded sensors and produce: a first alert indication upon identification of a characteristic indicative of an input power brownout; a second alert indication upon identification of a characteristic indicative of an input power surge; a third alert indication upon identification of a characteristic indicative of a machine short circuit; a fourth alert indication upon identification of a characteristic indicative of a motor phase insulation arch; a fifth alert indication upon identification of a characteristic indicative of a motor phase to ground arch; and a sixth alert indication upon identification of a characteristic indicative of a motor loss of phase.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 3 shows an exemplary control system for the mixing machine.

DESCRIPTION

Figure 1:
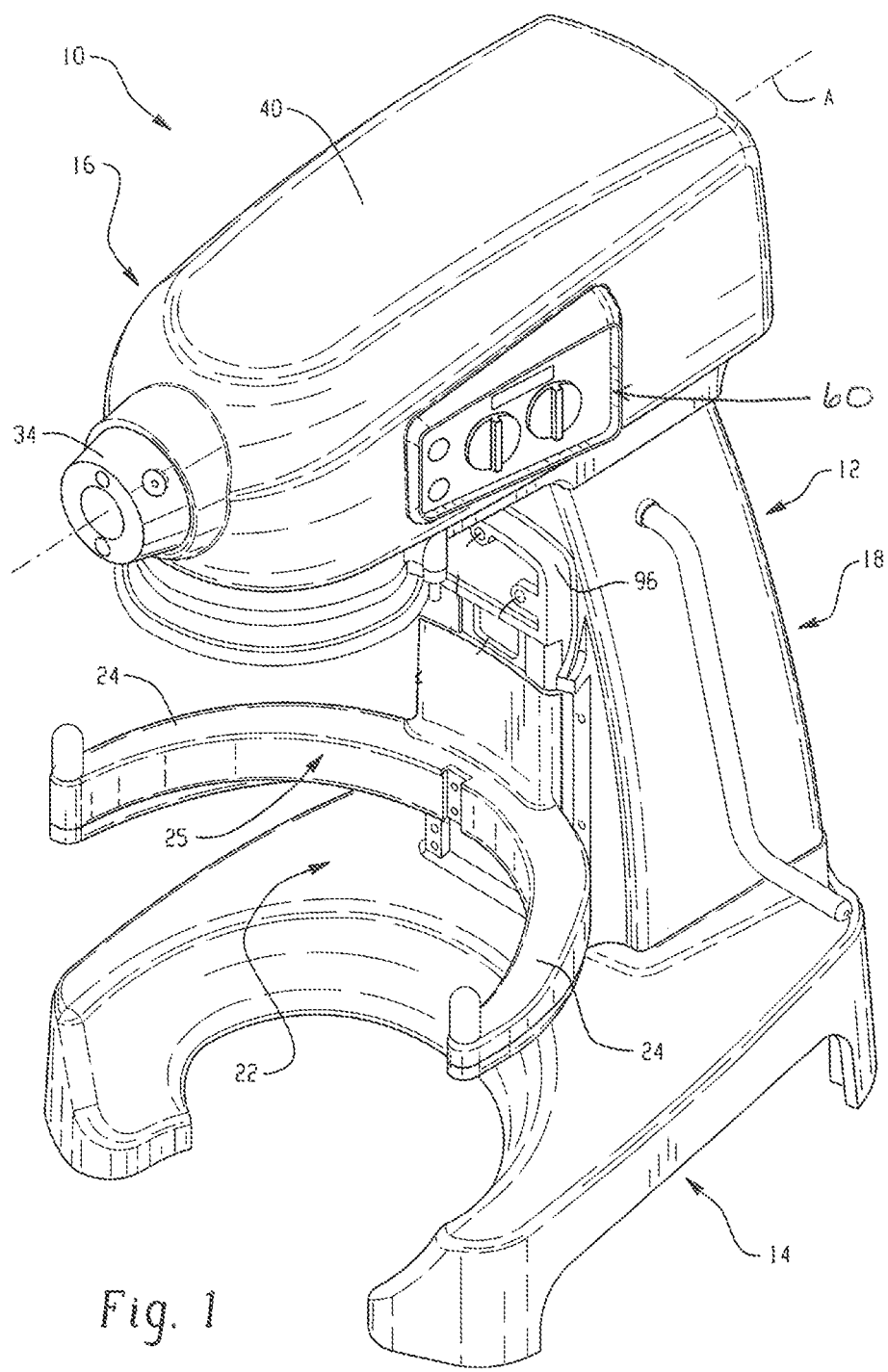
FIG. 1 shows a perspective view of a mixing machine.
Figure 2:
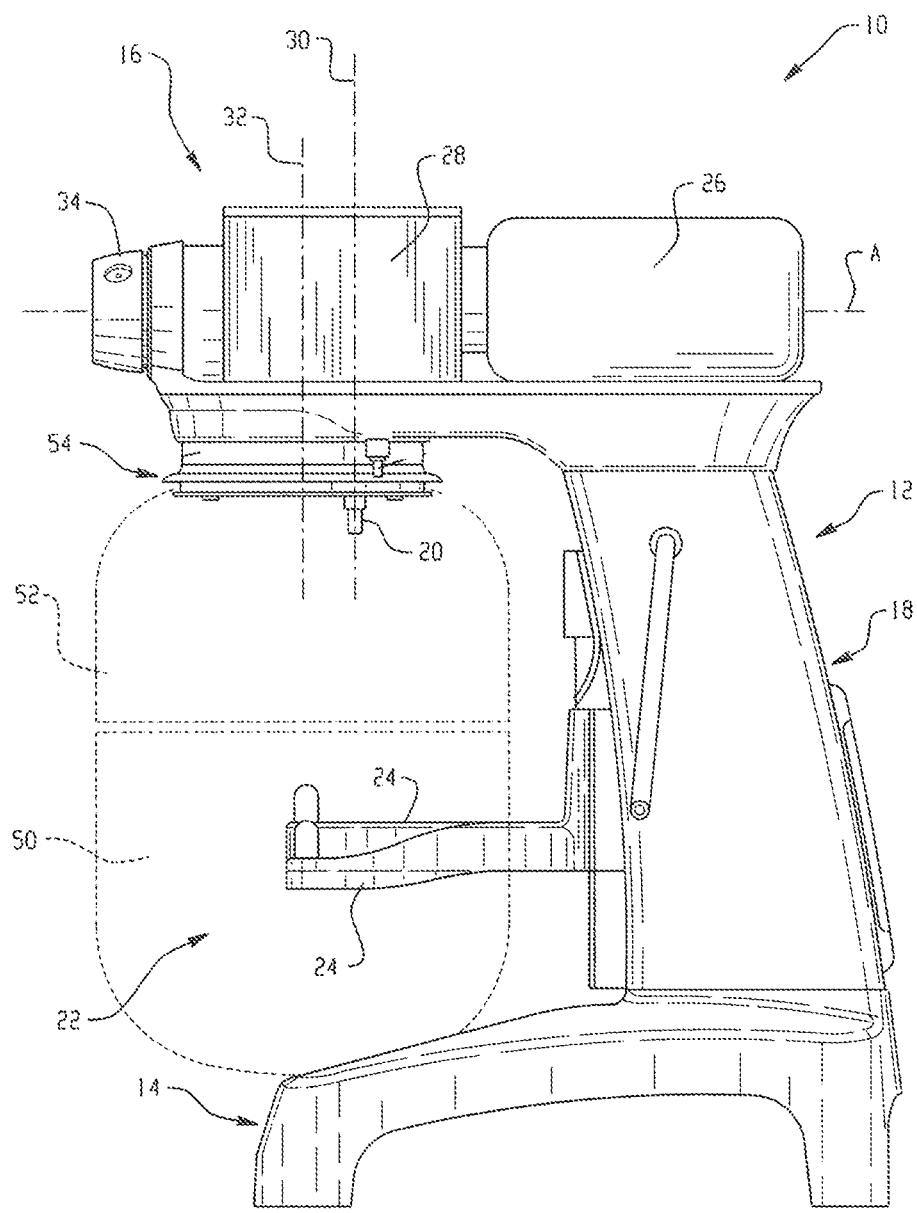
FIG. 2 shows a side view of the mixing machine of FIG. 1 with head cover removed.

Referring to FIGS. 1-2, a mixing machine 10 includes a mixer body 12 having a base portion 14, a head portion 16 and a support portion 18 (e.g., in the form of a column) connecting the head portion and the base portion in a vertically spaced apart relationship. A front to back head portion axis A is shown. An output member 20 (e.g., a shaft for receiving a mixer tool such as a beater or whip) extends downward from the head portion 16 in a direction toward a bowl receiving location 22 formed between the arms 24 of a bowl receiving yoke that can be moved upward and downward relative to the head portion 16 by rotation of the illustrated handle. Powered movement of the yoke is also possible. A motor 26 may be mechanically linked to the output member 20, as by a gear system 28, for effecting rotation of the output member about a first axis 30 and orbiting movement of the output member 20 and first axis 30 about a second axis 32 (e.g., a planetary movement or planetary rotation). A power take off 34 extends outwardly from a front side of the head portion 16 and may take the form of a protruding hub or boss that is adapted for connection with mixer accessories such as meat grinders, slicers etc. Internal of the power take off 34 is a drive member that is rotated by the motor 26 via the gear system 28. Head cover 40 is shown installed in FIG. 1, but is removed in FIG. 2.

An exemplary mix position of a bowl 50 is shown schematically in FIG. 2, along with an exemplary position of a bowl guard assembly 52. Bowl guard support 54 is located at the underside of the head portion 16 of the mixer and supports at least part of the bowl guard assembly 52 in a manner that enables the part to be moved between a bowl guarding position and a bowl access position.

The mixing machine also includes a user interface 60 with manual user controls (e.g., physically movable buttons, knobs and/or switches) and/or electronic user input controls (e.g., a touch-screen interface), with an associated processor-based controller (e.g., control board(s)) 100. The user interface 60 may have one or more display fields or screens 62 (FIG. 3). One or more communication paths 64 can be associated with the controller, such as a wired communication path (e.g., USB, RS485 etc.) or a wireless communication path 64 (e.g., any of Bluetooth, ZigBee, NFC, LAN/ WiFi, MAN/WiMAX, LoRaWAN or WAN/Cellular). The communication path(s) enable communication between the mixing machine control system and external/remote devices or systems 90 with respective communications 92.

The mixing machine control system includes a variable frequency drive 70 for operating the motor 26 (e.g., by varying frequency and voltage so as to control motor speed and torque to desired performance levels). The VFD 70 receives local power input from line 71 and includes multiple internal/embedded sensors that are useful for diagnostics of the machine. In particular, the VFD includes an input voltage sensor 72 and an input current sensors, as well as motor voltage phase sensors 76A-76C and motor current phase sensors 78A-78B that detect the output from the VFD, per Table 1 below.

TABLE 1

| VFD Sensors |
| --- |
| VFD Sensors |
| Input Voltage 72 |
| Input Current 74 |
| Motor Voltage Phase AB 76A |
| Motor Voltage Phase BC 76B |
| Motor Voltage Phase CA 76C |
| Motor Current Phase A 78A |
| Motor Current Phase A 78B |
| Motor Current Phase A 78C |

A diagnostic control 80 is provided on-board the VFD (e.g., as logic/firmware of the VFD) and is operable to monitor mixing machine conditions based upon the outputs or signals from the sensors. The diagnostic control 80 is configured to analyze signals from the embedded sensors and to produce alert indications based upon identification of an undesired performance characteristic. For example, the diagnostic control 80 may store and output diagnostic codes such as input power brownout, input power surge (e.g., due to lightning), machine short circuit, motor phase insulation arch, motor phase to ground arch and/or motor loss of phase, with corresponding exemplary alert indication messages shown in Table 2 below.

TABLE 2

Exemplary Diagnostics

| Diagnostic | Detected Condition(s) | Message |
| --- | --- | --- |
| Input Power Drop (Brownout) | Input voltage sensed by sensor 72 drops below a set lower limit | Brownout Alert |
| Input Power Surge (Lightning) | Input voltage sensed by sensor 72 rise above a set upper limit | Power Surge Experienced, Check XXX |
| Motor Phase Insulation Arch | Phase currents do not add up to zero and Phase voltages do not add up to zero and One phase voltage approaches another phase voltage | Motor Phase Arching between phases __ and __ |

TABLE 2-continued

Exemplary Diagnostics

| Diagnostic | Detected Condition(s) | Message |
| --- | --- | --- |
| Motor Phase to Ground Arch | Phase currents do not add up to zero and Phase voltages do not add up to zero and One or more phase voltages approaches zero | Motor phase to ground arch, phase __ |
| Motor Loss of Phase | Two phase currents are equal magnitude and opposite polarity and The third phase current is equal to zero | Motor Phase Loss, check connection for phase __ |

As indicated above, the diagnostic control 80 may be embedded logic/firmware within the VFD drive. However, in an alternative configuration, the VFD 70 may be connected to deliver data from the embedded sensors to the on-board mixing machine controller 100 that is connected with the VFD drive (e.g., the main or master control board associated with the user interface occasionally queries the VFD for the sensor data), and the diagnostic control 82 is incorporated into the logic/firmware/software of the mixing machine controller 100. Respective portions of the diagnostic functionality could also be split between the two controls 80 and 82.

The alerts may be delivered to one or more of (i) and on-board user interface (e.g., screen 62), (ii) a remote device or system 90 (e.g., a remote operator phone, PDA or computer at the facility where the mixing machine is located, or a remote service technician phone, PDA or computer remote from the facility where the mixing machine is located). The alerts may be in the form of messages as reflected above.

In some cases the mixing machine control system includes multiple stored mix programs (e.g., where each mix program includes at least one mix speed and mix time, and more likely multiple mix speeds with respective mix times, each of which will be carried out in sequence when the mix program is initiated and run on the machine). Each mix program may be selectable via a user interface of the machine. In such cases, the diagnostic control may track which mix program was active, if any, during the detected characteristic resulting in the alert.

The on-board diagnostic control may include more advanced features to not only produce an alert, but also recommend specific service/repair actions. In other cases, the remote service technician device or system may include algorithms and further diagnostics to provide the service technician with such recommended service/repair actions.

The subject system provides valuable diagnostics for the mixing machine without requiring the addition of any extra sensors beyond those embedded in the VFD. In addition, functions of the mixing machine can be altered based upon the diagnostics determined from the VFD sensors. For example, certain machine functions could be disabled (e.g., certain mix speeds in the case of an undesired trend) of the entire mixing machine can be shut down (e.g., in the case of a critical fault).

It is to be clearly understood that the above description is intended by way of illustration and example only, is not intended to be taken by way of limitation, and that other changes and modifications are possible.

What is claimed is:

1. A mixing machine, comprising:
a head extending over a bowl receiving location, the head including a downwardly extending rotatable output shaft for receiving a mixer tool, the head including a gear system therewithin for effecting rotation of the rotatable output shaft about its axis and orbiting of the shaft axis about another axis;
an electric motor having an output operatively connected to drive the gear system;
a variable frequency drive connected to deliver 3-phase power to the electric motor to achieve variable speed and torque, wherein the variable frequency drive includes a plurality of embedded sensors internal of the variable frequency drive, including embedded current sensors and embedded voltage sensors;
and a diagnostic control configured to analyze outputs from the embedded sensors and produce an alert indication upon identification of a characteristic indicative of at least one of input power brownout, input power surge, machine short circuit, motor phase insulation arch, motor phase to ground arch or motor loss of phase.

2. The mixing machine of claim 1 wherein the diagnostic control is configured to deliver the alert indication to one or more of (i) and on-board user interface of the mixing machine or (ii) a remote device or system.

3. The mixing machine of claim 2 wherein the remote device or system is one of a remote operator device or system or a remote service technician device or system.

4. The mixing machine of claim 2 wherein the mixing machine includes a wired or wireless communication connection for delivering the alert indication to the remote device or system.

5. The mixing machine of claim 1 wherein the diagnostic control is embedded within the variable frequency drive.

6. The mixing machine of claim 1 wherein the variable frequency drive is connected to deliver data from the embedded sensors to an on-board mixing machine controller that is connected with the variable frequency drive, and the diagnostic control is incorporated into the mixing machine controller.

7. The mixing machine of claim 1 wherein the diagnostic control is operable to analyze outputs from the embedded sensors and to produce distinct alert indications upon identification of a respective characteristic indicative of each of (i) input power brownout, (ii) input power surge, (iii) machine short circuit, (iv) motor phase insulation arch, (v) motor phase to ground arch or (vi) motor loss of phase.

8. A mixing machine, comprising:
a head extending over a bowl receiving location, the head including a downwardly extending rotatable output shaft for receiving a mixer tool, the head including a gear system therewithin for effecting rotation of the rotatable output shaft about its axis and orbiting of the shaft axis about another axis;
an electric motor having an output operatively connected to drive the gear system;
a variable frequency drive connected to deliver 3-phase power to the electric motor to achieve variable speed and torque, wherein the variable frequency drive includes a plurality of embedded sensors, including embedded current sensors and embedded voltage sensors; and
a diagnostic control configured to analyze outputs from the embedded sensors and produce an alert indication upon identification of a characteristic indicative of at least one of input power brownout, input power surge, machine short circuit, motor phase insulation arch, motor phase to ground arch or motor loss of phase;
wherein the variable frequency drive is connected to an on-board mixing machine controller, and the diagnostic control is in part incorporated into the mixing machine controller and in part embedded within the variable frequency drive.

9. A mixing machine, comprising:
a head extending over a bowl receiving location, the head including a downwardly extending rotatable output shaft for receiving a mixer tool, the head including a planetary system therewithin for effecting rotation of the rotatable output shaft about its axis and orbiting of the shaft axis about another axis;
an electric motor having an output operatively connected to drive the gear system;
a variable frequency drive connected to deliver 3-phase power to the electric motor to achieve variable speed and torque, wherein the variable frequency drive includes a plurality of embedded sensors, including embedded current sensors and embedded voltage sensors;
and a diagnostic control configured and operable to analyze outputs from the embedded sensors and produce:
a first alert indication upon identification of a characteristic indicative of an input power brownout;
a second alert indication upon identification of a characteristic indicative of an input power surge;
a third alert indication upon identification of a characteristic indicative of a machine short circuit;
a fourth alert indication upon identification of a characteristic indicative of a motor phase insulation arch;
a fifth alert indication upon identification of a characteristic indicative of a motor phase to ground arch; and
a sixth alert indication upon identification of a characteristic indicative of a motor loss of phase.

* * * * *